Patented Jan. 15, 1935

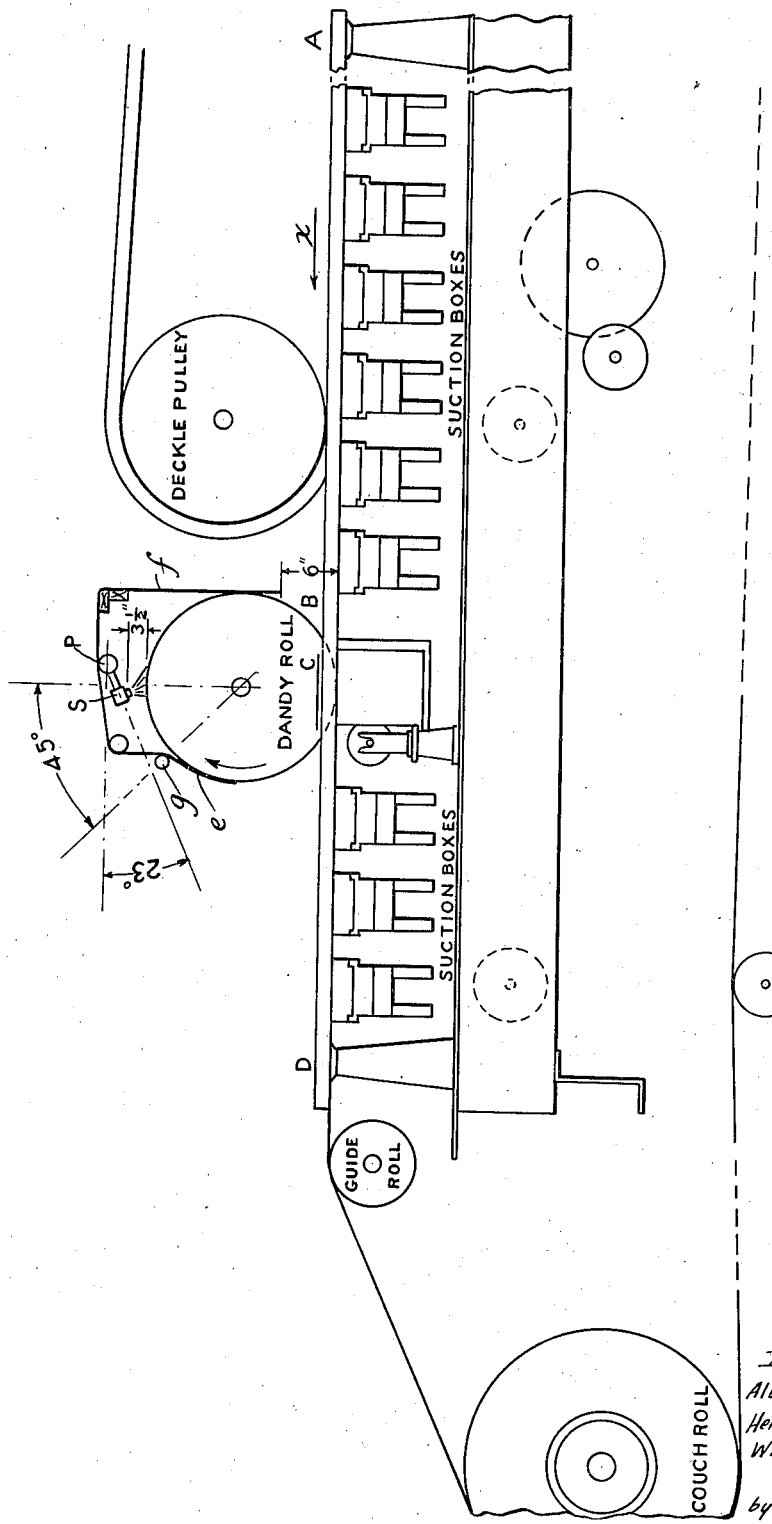

1,988,179

UNITED STATES PATENT OFFICE 1,988,179

OPAQUE PAPER

Albert G. Natwick, Henry E. Ostenson, and William R. Barber, Camas, Wash., assignors to Crown Willamette Paper Company, San Francisco, Calif., a corporation of Delaware Application July 21, 1933, Serial No. 681,528

11 Claims. (Cl. 92—40)

The object of our invention is to produce an opaque paper closely resembling the so-called coated paper; and further to obtain such result without having recourse to any expensive coating process; or to a process which involves the conversion of paper that has already been finished on the paper machine.

The particular object of our invention is to produce opaque paper by the application of a coating pigment while the paper is being made on the paper machine, and by which the degree of opacity may be controlled.

Our invention has special utility in the production of book, envelope, and label papers, which are required to have ample opacity, and a surface especially suitable for printing.

Another advantageous use of our invention is in the making of milky-white, or other color, opaque, waxed paper, such as bread wrappers which our method will produce economically with the use of costly pigments, such as titanium dioxide, zinc sulphide and blends of varying proportions of these with barium sulphates and calcium sulphates.

Two methods present themselves for opacifying paper. One of these methods consists in depositing the pigment as a coating on one side of the sheet. But the method heretofore used for this purpose required special coating machinery, and special processing supplementary to the regular making of the sheet, rendering this method costly.

The other method is simpler. It consists in adding the pigment to the pulp in the beater, in the same manner as filler or loading material is added to the furnish, and requires only a single operation. The latter method, however, has several serious drawbacks, one of which is, it is not flexible. In short, under the customary practice of filler incorporation by addition to pulp in the beater, once the pulp has been prepared, and been dumped into the stock chest, no change in filler content can be made within several hours, during which period further work would have to cease, for it is necessary to produce a sheet of uniform opacity.

Besides, in order to obtain a sheet of desired opacity, a relatively costly pigment must be used. Such materials as clay and talc, common paper fillers, produce opacity, but when a relatively strong sheet is to be made, large amounts of pigment or filler will destroy the strength of the paper. Thus, in making envelope paper, for example, it is necessary to use a pigment giving effective opacity by the use of a relatively small quantity of the pigment. For such purpose only pigments having a high reflective index to light may be successfully used; for example, titanium dioxide, zinc sulphide and blends of varying portions of these with barium sulphates and calcium sulphates. These pigments further give far better results than clay or talc, where the sheet is to be waxed, but are costly.

Another objectionable feature of the second method is the pigment when applied to the sheet by intermixing with the pulp in the beater has a very low retentive value; and valuable usage of the pigment is necessary, for the cost of opacified paper must be low, in order to produce a marketable commodity.

Therefore the object of our invention cannot be economically attained by ordinary method of adding in the pigment or filler to the beater furnish.

Furthermore, paper opacified by our method, with said pigments of high reflective index to light have much greater opacity after they have been waxed, than results from the use of the same pigments as a part of the beater furnish. Our method in short produces, at relatively low cost, a waxing paper of the desired opacity.

We attain our object by the method hereinafter described, and by the use for such method of certain devices incorporated in the paper making machine, as illustrated in the accompanying drawing.

This drawing shows diagrammatically that section of a Fourdrinier paper making machine where the fibers have been drawn free enough of water, and sufficiently set in their final "formation" by the suction boxes, for the sheet to be pressed, freed of water, and dried. The direction of movement of the sheet is assumed to be as indicated by the arrow $x$, thus from station A towards station D. It is assumed that considerable water has already been removed from the sheet previous to its arrival at station A by normal drainage thru the wire.

Ordinarily in a paper making machine about 5% dryness of the sheet, or so-called "cut-off" to a "dry" sheet, would be attained or in other words the sheet has about 95% wetness at about station D, or at the suction boxes immediately in front of it. Our method, however, requires that the sheet receive special preparation, in order to adapt it for receiving the pigment-suspending water, which is applied thru the medium of the dandy roll.

The sheet must be in a sufficiently dry condition to serve as a filtering mat; letting the water run thru, but retaining the pigment particles as a deposit on the upper surface of the sheet. Therefore we provide additional suction boxes whereby the 5% dryness or "cut-off" is attained at station B, thus some distance in advance of the dandy roll; and the sheet then runs in that condition from station B to station C, the location of the dandy roll.

The pigment suspension in water which worked best was within the limits of 0.2 to 0.3 lb. per gallon of water. If the pigment water is too thick the paper will likely be "streaked" with more pigment in some places than others; if too thin, the washing effect, or fiber reflotation upon the felted sheet is too disturbing for high retention.

The pigment water when applied brings the wetness of the sheet to about 97½%; and the sheet is again brought to the 5% dryness by the action of the suction boxes directly in advance of station D, thus after passing the dandy roll.

The spray of pigment water is best directed at an angle against the top of the dandy roll, and its dripping down on the sheet from the ascending side of the dandy roll prevented, since such dripping down would cause spotting of the sheet. The spray must further be evenly distributed over the descending side of the dandy roll to effect even application of the pigment water to the sheet.

We spray the pigment water on the dandy roll by a series of suitable spray heads s, supplied from a pipe p, assumed to be connected to a suitable supply of pigment-suspending water. Spray heads purchasable on the market under the name "Buffalo" may be used. These spray heads are set with their centers 7 inches apart, longitudinally along the entire top of the dandy roll. The spray heads should be arranged so as to direct their spray on the upper peripheral surface of the dandy roll, at its descending side. We place the spray heads about 3½ inches above the top of, and slightly to one side of the vertical plane intersecting the center of the dandy roll; and so that the axes of the bores of said spray heads make an angle of approximately 23° with said side. Such angular arrangement we found best in practice to follow within close limits.

Further, the dandy roll must be specially prepared. It must have wire covering of a mesh neither too fine nor too coarse. We found a 50 mesh wire covering best.

The pigment water is preferably sprayed on the dandy roll at a pressure of about 20 to 30 pounds.

It is necessary to provide wipers or curtains e, f, on both the rising and the descending sides of the dandy roll. We preferably use felt curtains. The curtain e located on the rising side of the dandy roll is best held against a substantial preripheral section of the dandy roll, as by roller g, in such manner as to cause the wiper to prevent large drops of the pigment water dripping from the dandy roll onto the sheet, which would cause heavy pigment spots to show up in the finished sheets.

The felt curtain f suspended in contact with the descending side of the dandy roll functions to brush out the pigment water uniformly over the entire length of the dandy roll, thus assuring a uniform coating of the sheet with the opacifying pigment, and avoids streaking.

The arrangement of the felt curtains on the rising and descending sides of the dandy roll shown in the drawing, we believe best. The parts of the drawing are approximately relatively arranged with reference to a common scale.

Valuable usage, in other words, the very high retentive value of the pigment which we obtain is one of the advantages of our invention.

A further advantage of our method lies in the fact that our finished sheet approximates to a closer degree a coated sheet; namely, is characterized by a continuous film of the opacifying material laid upon one surface of the sheet. And when the sheet is to be waxed, a much higher opacity is obtained with our method of coating than one where the pigment has been introduced into the beater.

Our method possesses further the advantage tending toward economy, and toward a uniformity of finished product. This lies in the readiness with which, and the brief interval of time in which we can change the amount of pigment on the finished sheet.

By our method we are able to control and change the amount of pigment incorporated on the sheet within a few minutes by merely changing the proportion of pigment suspended in the water delivered to the spray heads. Thus we have absolute control of the degree of opacity desired.

We claim:

1. In combination with a paper making machine, means for coating the sheet while being made, comprising devices for effecting a "cut-off" to a "dry" sheet in those sections of the web which become successively located in advance of the dandy-roll of the machine, a spray element arranged to spray the upper peripheral surface of the dandy-roll, means preventing dripping from the ascending side of the dandy-roll onto said sections, and other means distributing the spray longitudinally over the descending side of said dandy-roll.

2. In combination with a paper making machine, means for coating the sheet while being made, comprising devices for effecting a "cut-off" to a "dry" sheet in those sections of the web which become successively located in advance of the dandy-roll of the machine, the dandy-roll being provided with a wire covering having a mesh substantially as described, a spray element arranged to spray the upper peripheral surface of the dandy-roll, means preventing dripping from the ascending side of the dandy-roll onto said sections, and other means distributing the spray longitudinally over the descending side of said dandy-roll.

3. In combination with a paper making machine, means for coating the sheet while being made, comprising devices for effecting a "cut-off" to a "dry" sheet in those sections of the web which become successively located in advance of the dandy-roll of the machine, the dandy-roll being provided with a wire covering having approximately a 50-mesh, a spray element arranged to spray the upper peripheral surface of the dandy-roll, means preventing dripping from the ascending side of the dandy-roll onto said sections, and other means distributing the spray longitudinally over the descending side of said dandy-roll.

4. In combination with a paper making machine, means for coating the sheet while being made, comprising devices for effecting a "cut-off" to a "dry" sheet in those sections of the web which become successively located in advance of the dandy-roll of the machine, a spray element located above the peripheral surface of the dandy roll substantially as described, adapted to project spray jets making an angle substantially as described with the vertical plane intersecting the axis of the dandy-roll on the rising side of the latter, means preventing dripping from the ascending side of the dandy-roll onto said sections, and other means distributing the spray longitudinally over the descending side of said dandy-roll.

5. In combination with a paper making machine, means for coating the sheet while being made, comprising devices for effecting a "cut-off" to a "dry" sheet in those sections of the web which become successively located in advance of the dandy-roll of the machine, the dandy-roll being provided with a wire covering having a mesh substantially as described, a spray element located above the peripheral surface of the dandy-roll substantially as described, adapted to project spray jets making an angle of approximately 23° with the vertical plane intersecting the axis of the dandy-roll on the rising side of the latter, means preventing dripping from the ascending side of the dandy-roll onto said sections, and other means distributing the spray longitudinally over the descending side of said dandy-roll.

6. In combination with a paper making machine, means for coating the sheet while being made, comprising devices for effecting a "cut-off" to a "dry" sheet in those sections of the web which become successively located in advance of the dandy-roll of the machine, the dandy-roll being provided with a wire covering having a mesh substantially as described, a spray element located above the peripheral surface of the dandy-roll substantially as described, adapted to project spray jets making an angle, substantially as described, with the vertical plane intersecting the axis of the dandy-roll on the rising side of the latter, means preventing dripping from the ascending side of the dandy-roll onto said sections, and other means distributing the spray longitudinally over the descending side of said dandy-roll.

7. In combination with a paper making machine, means for coating the sheet while being made, comprising devices for effecting a "cut-off" to a "dry" sheet in those sections of the web which become successively located in advance of the dandy-roll of the machine, a spray element arranged to spray the upper peripheral surface of the dandy-roll, a wiping element supported to have contact with the peripheral segment of the rising side of the dandy-roll, and a brushing element bearing on the descending side of the dandy-roll.

8. In combination with a paper making machine, means for coating the sheet while being made, comprising devices for effecting a "cut-off" to a "dry" sheet in those sections of the web which become successively located in advance of the dandy-roll of the machine, the dandy-roll being provided with a wire covering having a mesh substantially as described, a spray element arranged to spray the upper peripheral surface of the dandy-roll, a wiping element supported to have contact with the peripheral segment of the rising side of the dandy-roll, and a brushing element bearing on the descending side of the dandy-roll.

9. In combination with a paper making machine, means for coating the sheet while being made, comprising devices for effecting a "cut-off" to a "dry" sheet in those sections of the web which become successively located in advance of the dandy-roll of the machine, the dandy-roll being provided with a wire covering having a mesh substantially as described, a spray element located above the peripheral surface of the dandy-roll substantially as described, adapted to project spray jets making an angle substantially as described with the vertical plane intersecting the axis of the dandy-roll on the rising side of the latter, a wiping element supported to have contact with the peripheral segment of the rising side of the dandy-roll, and a brushing element bearing on the descending side of the dandy-roll.

10. In combination with a paper making machine, means for coating the sheet while being made, comprising devices for effecting a "cut-off" to a "dry" sheet in those sections of the web which become successively located in advance of the dandy-roll of the machine, the dandy-roll being provided with a wire covering having a mesh substantially as described, a spray element located above the peripheral surface of the dandy-roll substantially as described, adapted to project spray jets making an angle substantially as described with the vertical plane intersecting the axis of the dandy-roll on the rising side of the latter, a curtain supported to have contact with the peripheral segment of the rising side of the dandy-roll, and a curtain bearing on the descending side of the dandy-roll.

11. In the machine making of paper, the method of coating the web with a pigment comprising reducing the moisture in those sections of the web which become located successively in advance of the dandy-roll of the machine, to approximately 95% of wetness, to cause the fibers of said web sections to assume filtering formations, replacing approximately one-half of the amount of moisture removed from said sections by a water-suspension pigment, having a consistency approximately as described, thru the medium of a dandy roll, controlling said application so as to become evenly distributed over the entire width of said section, and then again bringing the web to approximately 95% wetness and completing the formation of a sheet.

ALBERT G. NATWICK.
HENRY E. OSTENSON.
WILLIAM R. BARBER.